United States Patent
Zeinalov et al.

(10) Patent No.: US 11,060,406 B2
(45) Date of Patent: Jul. 13, 2021

(54) ROTOR FOR GAS TURBINE ENGINE

(71) Applicant: PRATT & WHITNEY CANADA CORP., Longueuil (CA)

(72) Inventors: Jamal Zeinalov, Mississauga (CA); Eric Ho, Markham (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 16/599,798

(22) Filed: Oct. 11, 2019

(65) Prior Publication Data
US 2021/0108516 A1  Apr. 15, 2021

(51) Int. Cl.
*F01D 5/14* (2006.01)
*F04D 29/32* (2006.01)

(52) U.S. Cl.
CPC .......... *F01D 5/141* (2013.01); *F04D 29/324* (2013.01); *F05D 2240/301* (2013.01)

(58) Field of Classification Search
CPC ... F01D 5/022; F01D 5/34; F01D 5/02; F01D 5/20; F01D 5/225; F01D 5/087; F01D 5/146; F01D 5/12; F01D 5/143; F01D 5/3046; F01D 5/3084; F01D 5/187; F01D 5/282; F01D 5/3007; F01D 9/04; F04D 29/321; F04D 19/022; F04D 29/326; F04D 29/284; F05D 2220/32; F05D 2220/323; F05D 2220/326; F05D 2220/327; F05D 2240/20; F05D 2240/24; F05D 2240/307; F05D 2240/80; F05D 2260/30; F05D 2300/6033; F05B 2240/301
USPC ...... 415/209.4, 77, 79; 416/126, 127, 157 R, 416/193 R, 234, 223 R
See application file for complete search history.

(56) References Cited

U.S. PATENT DOCUMENTS

| | | | |
|---|---|---|---|
| 5,988,980 A * | 11/1999 | Busbey | F01D 5/225 416/193 R |
| 6,454,535 B1 * | 9/2002 | Goshorn | F01D 5/022 416/193 R |
| 7,758,303 B1 * | 7/2010 | Wadia | F01D 5/022 415/77 |
| 8,667,774 B2 | 3/2014 | Kuehn et al. | |
| 8,667,775 B1 | 3/2014 | Kisska et al. | |
| 10,247,015 B2 | 4/2019 | Kush et al. | |
| 2019/0368502 A1 * | 12/2019 | Rakuff | F04D 29/444 |

* cited by examiner

*Primary Examiner* — J. Todd Newton
*Assistant Examiner* — Eric J Zamora Alvarez
(74) *Attorney, Agent, or Firm* — Norton Rose Fulbright Canada LLP

(57) ABSTRACT

A rotor for an aircraft engine includes a hub having a rotation axis, a circumferential array of structural members extending radially outward from the hub to an annular ring, the structural members having cross-sections that increase in length as the structural members extend from the hub to the annular ring, the length of each cross-section of the cross-sections defined by opposite edges of a structural member of the structural members that corresponds to that cross-section, and a circumferential array of airfoils extending radially outward from the annular ring.

14 Claims, 4 Drawing Sheets

ROTOR FOR GAS TURBINE ENGINE

TECHNICAL FIELD

The application relates to gas turbine engine rotors.

BACKGROUND OF THE ART

In turbomachines, such as gas turbine engines, the rotating components of the compressor and turbine stages are typically connected to a central shaft through a disc structural component. This structural component is typically designed to withstand the centrifugal and aerodynamic loads of the rotating components as well as to reduce the deflection of the rotating blades. While such rotors are suitable for their intended purposes, improvements can be made and are always desirable in the aerospace industry.

SUMMARY

In one aspect, there is provided a rotor for an aircraft engine, comprising: a hub having a rotation axis; a circumferential array of structural members extending radially outward from the hub to an annular ring, the structural members having cross-sections that increase in length as the structural members extend from the hub to the annular ring, the length of each cross-section of the cross-sections defined by opposite edges of a structural member of the structural members that corresponds to that cross-section; and a circumferential array of airfoils extending radially outward from the annular ring.

In some embodiments, the rotor is one of a turbine rotor for a turbine section of the aircraft engine and a compressor rotor for a compressor section of the aircraft engine.

In some embodiments, the structural members are shaped such that for a given one of the structural members, cross-sections of the given structural member taken at least through a portion of the given structural member at decreasing radial distances from the rotation axis are correspondingly more and more aligned with a plane of rotation of the hub.

In some embodiments, the structural members are shaped such that for the given one of the structural members, cross-sections of the given structural member taken through an entire radial length of the given structural member at the decreasing radial distances from the rotation axis are correspondingly more and more aligned with the plane of rotation of the hub.

In some embodiments, the hub includes a central portion having a first thickness measured parallel to the rotation axis, and a disc extending radially away from the central portion parallel to a plane of rotation of the hub, the disc has a second thickness measured parallel to the rotation axis, the second thickness is smaller than the first thickness, and the structural members connect to the disc.

In some embodiments, the disc has a first diameter defined by the radially-outer periphery and measured in a plane of rotation of the hub, the annular ring has a second diameter measured in the plane of rotation, and the first diameter is between 25% and 75% of the second diameter.

In some embodiments, the first diameter is between 30% and 70% of the second diameter.

In some embodiments, the structural members are at least in part airfoil shaped.

In some embodiments, the cross-sections of the structural members contacting the annular ring are angled between 10 and 60 degrees relative to the rotation axis.

In some embodiments, the cross-sections of the structural members contacting the hub are angled between 60 and 90 degrees relative to the rotation axis.

In some embodiments, a width of the cross-sections varies along at least a portion of the structural members.

In another aspect there is provided a gas turbine engine, comprising: in serial flow communication a compressor section, a combustor (C), and a turbine section; one or both of the compressor section and the turbine section including a rotor having: a rotatable hub, an annular ring at least partially surrounding the hub and spaced apart therefrom, a circumferential array of structural members extending between the hub to the annular ring, the structural members twisted to approach in cross-sectional alignment a plane of rotation of the hub in a direction from the annular ring toward the hub, and a circumferential array of airfoils extending radially outward from the annular ring.

In some embodiments, the airfoils define a part of a first airflow path fluidly connecting the compressor section and the turbine section, and the structural members define a second airflow path extending through a part of the gas turbine engine and being different from the first airflow path.

In some embodiments, the rotor is a plurality of rotors.

In some embodiments, the compressor section includes at least one of the plurality of rotors, and the turbine section includes at least one of the plurality of rotors.

In some embodiments, radially-inner cross-sections of the structural members are defined by four sides interconnected by convex portions.

In some embodiments, cross-sections of the structural members contacting the annular ring are angled between 10 and 60 degrees relative to the rotation axis; and cross-sections of the structural members contacting the hub are angled between 60 and 90 degrees relative to the rotation axis.

In yet another aspect there is provided a method of distributing a load in a rotor of a gas turbine engine, comprising rotating the rotor about a rotation axis of the rotor, and during the rotating, transferring a load between airfoils of the rotor and a hub of the rotor via structural members extending outwardly from the hub and an annular ring interconnecting the structural members and the airfoils, cross-sections of the structural members increasing in length in a direction from the hub to the annular ring.

In some embodiments, the step of transferring the load includes transferring load between radially-outer ones of the cross-sections of the structural members, the annular ring, and radially-inner ones of cross-sections of the airfoils which are superposed in a radial direction over corresponding ones of the radially-outer ones of the cross-sections of the structural members.

In some embodiments, the method comprises generating a first airflow with the structural members and a second airflow with the airfoils, the second airflow being different from the first airflow.

BRIEF DESCRIPTION OF THE DRAWINGS

Reference is now made to the accompanying figures in which.

DETAILED DESCRIPTION

While the rotor technology of the present application is described herein with respect to a turbine rotor of an aircraft engine, the rotor technology of the present application may likewise be used with respect to other rotor(s) of the aircraft engine, such as a compressor rotor for example. Also, while the rotor technology of the present application is described herein with respect to a particular type of aircraft engine, the rotor technology of the present application may likewise be used with other types of aircraft engines and/or in other applications.

Figure 1:
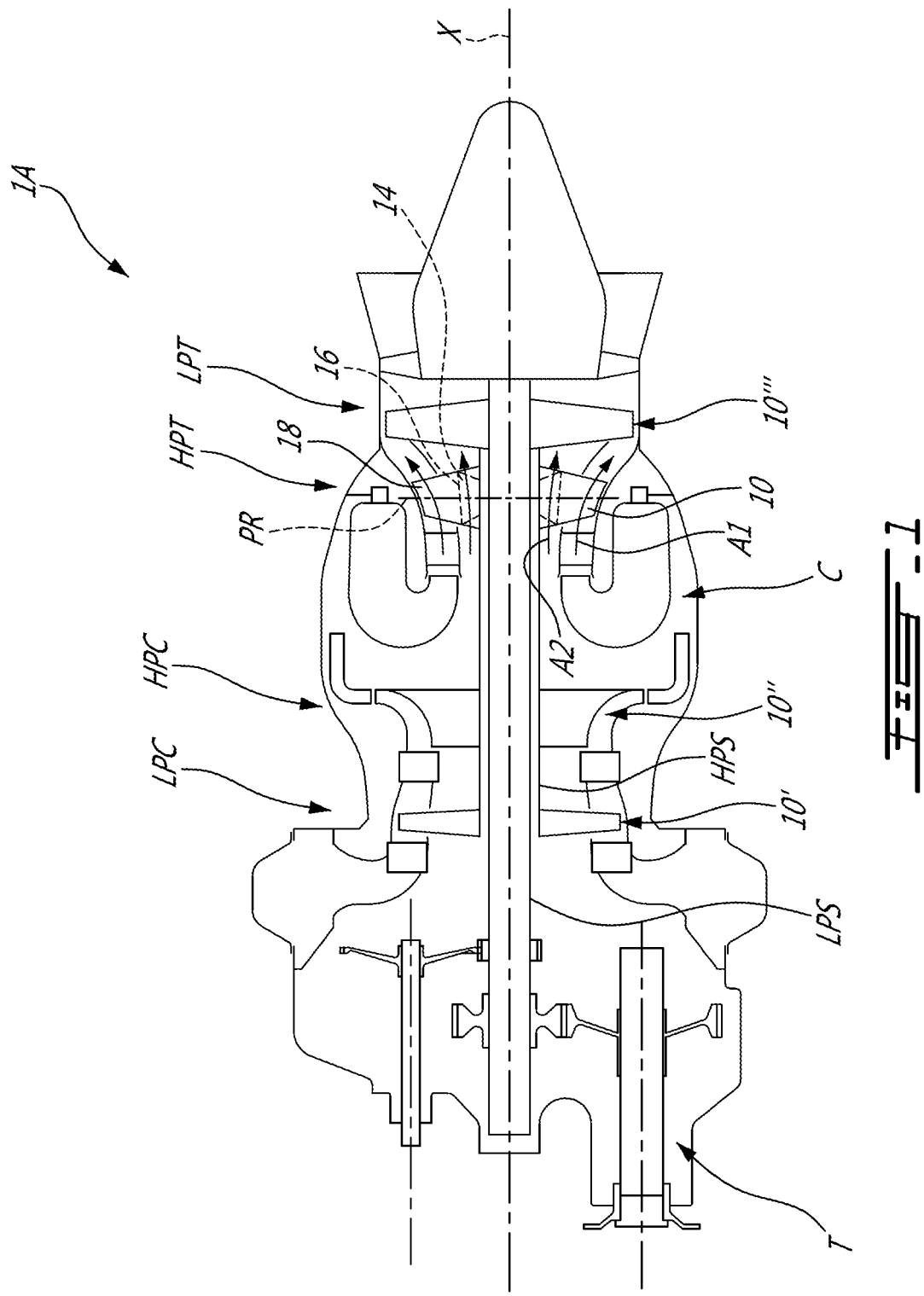
FIG. 1 is a schematic cross sectional view of an aircraft engine.

FIG. 1 illustrates an aircraft engine 1A, which may be part of an aircraft, such as a conventional aircraft for example. In this example, the engine 1A is a turboshaft engine 1A, but could be any other type of aircraft engine. In this embodiment, the engine 1A includes in serial flow communication a low pressure compressor section (LPC) and a high pressure compressor section (HPC) for pressurizing air, a combustor (C) in which the compressed air is mixed with fuel and ignited for generating a stream of hot combustion gases, a high pressure turbine section (HPT), and a lower pressure turbine section (LPT). The respective pairs of the compressor and turbine sections are interconnected via respective low pressure and high pressure spools/shafts (LPS), (HPS) that are in this embodiment coaxial and independently rotatable about a rotation axis (X) of the engine 1A. The engine 1A includes a transmission (T) driven by the low pressure turbine section (LPT) for outputting motive power to an aircraft.

As shown schematically in FIG. 1, the low pressure turbine section (LPT) includes a turbine rotor 10 implemented according to the present technology. While the single turbine rotor 10 is shown, the low pressure turbine section (LPT) (as with the other turbine/compressor sections of the engine 1A) may have any suitable number of rotors, one or more of which may be similar to the rotor 10. While the present technology is illustrated with respect to the rotor 10 of the low pressure turbine section (LPT), the present technology may also be applied to one or more rotor(s) that the high pressure turbine section (HPT) may have, and/or one or more rotor(s) that the low pressure compressor section (LPC) may have, and/or one or more rotor(s) that the high pressure compressor section (HPC) may have. To show this, schematically one or more rotors of the LPC, HPC, and the HPT sections have been labeled with corresponding reference numerals 10', 10", 10"'.

Figure 2A:
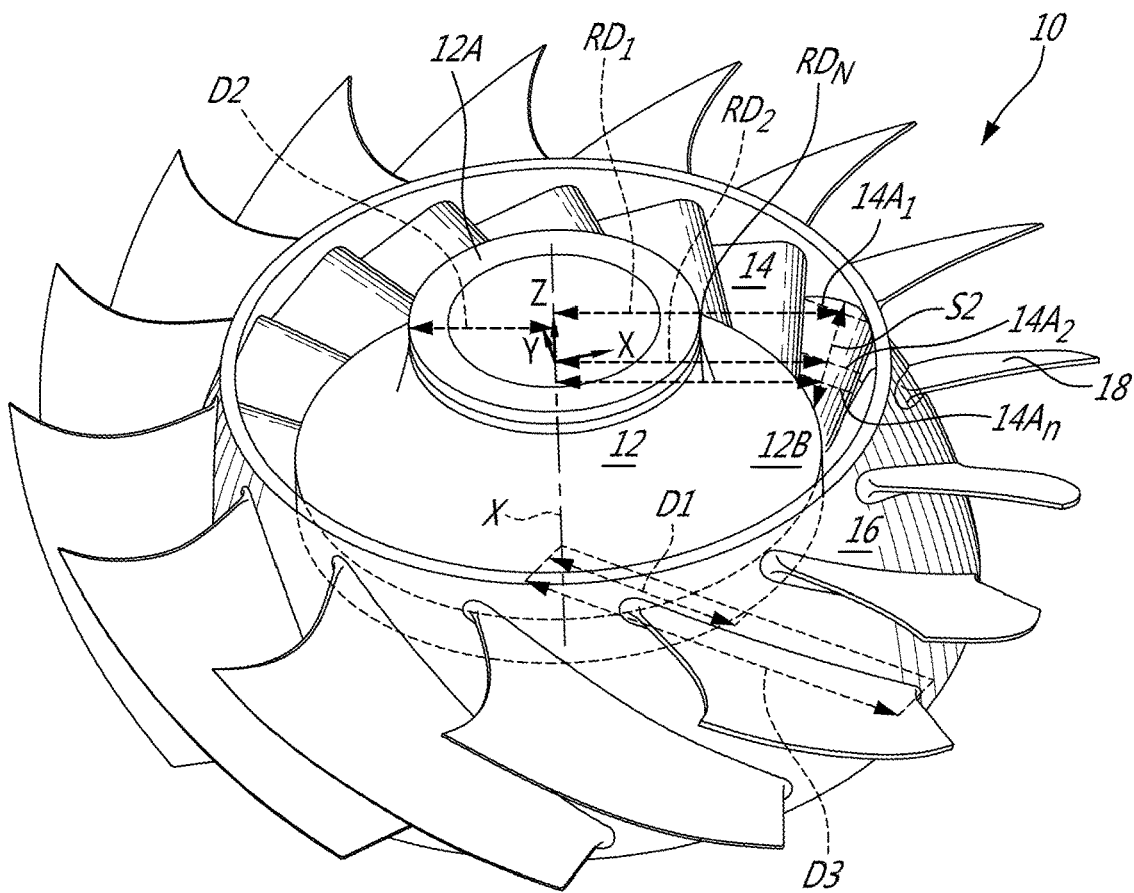
FIG. 2A is a perspective view of a rotor of the aircraft engine of FIG. 1.
Figure 2B:
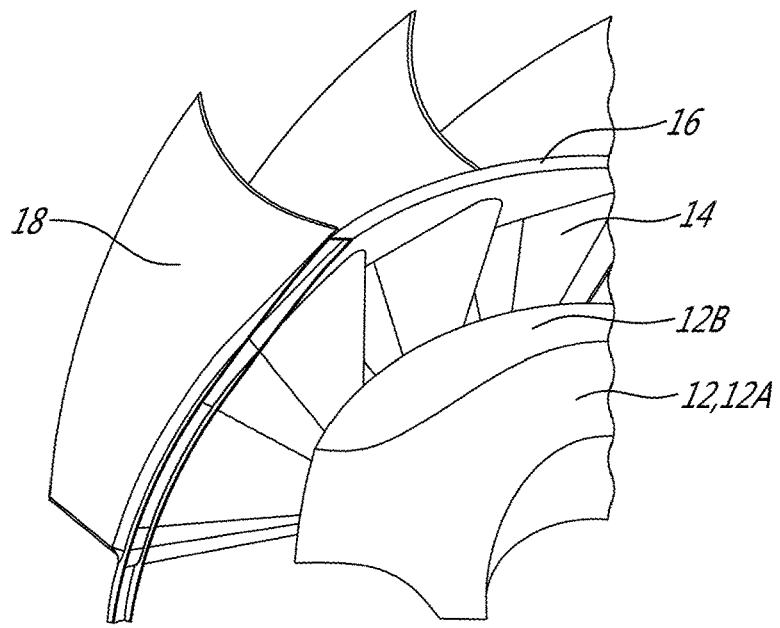
FIG. 2B is a perspective partial cross-section of the rotor of FIG. 2A.

FIGS. 2A and 2B illustrate the rotor 10 in more detail. The rotor 10 includes a hub 12 rotatable about a rotation axis, which in this embodiment is the rotation axis (X) of the spools/shafts (LPS), (HPS). The hub 12 is structured to connect to a shaft using any suitable mechanism, such as a conventional mechanism. In this embodiment, and although this may be different in other embodiments, the hub 12 is connected to the low pressure shaft (LPS) by receiving the low pressure shaft (LPS) in a central aperture of the hub 12. As shown, in this embodiment, the hub 12 includes a central portion 12A having a thickness (T2) measured parallel to the rotation axis (X) and a diameter (D2) defined by a radially-outer periphery/surface of the central portion 12A. The hub 12 in this embodiment further includes and a disc 12B extending radially away from the central portion 12A parallel to a plane of rotation of the hub 12. The disc 12B has a thickness (T1) measured parallel to the rotation axis (X). The thickness (T1) is smaller than the thickness (T2). As best seen in FIG. 3B, in this embodiment the thickness (T1) is 20% of the thickness (T2). In other embodiments, the thickness (T1) may be in a range of 10% to 60% of the thickness (T2). Yet other ratios may be used, for example depending on the particular embodiment and/or application of the rotor 10. As best shown in FIG. 2A, the disc 12B has a diameter (D1) defined by a radially-outer periphery/surface of the disc 12B and measured in a plane of rotation (PR) (FIG. 1) of the hub 12.

Referring to FIGS. 2A and 2B, the rotor 10 further includes a circumferential array of structural members 14 which at their radially-inner ends connect to the hub 12, and more particularly to the disc 12B in this embodiment. The structural members 14 have radial lengths (RL) and in this embodiment are similar to each other. Therefore only one of the structural members 14 has been labeled in each figure. In this particular embodiment, the structural members 14 extend radially outward from the radially-outer periphery/surface, and hence from the hub 12 and the disc 12B, to an annular ring 16 disposed at least in part over the hub 12. The structural members 14 connect at their radially-outer ends to a radially-inner surface of the annular ring 16 which faces toward the hub 12. In this embodiment, and as best seen in FIG. 3A for example, the radially-inner surface of the annular ring 16 is concave.

As shown, the annular ring 16 has a thickness (T3) measured parallel to the rotation axis (X), and a diameter (D3) measured in the plane of rotation (PR). In this embodiment, the diameter (D1) of the disc 12B is 70% of the diameter (D3) of the annular ring 16. In other embodiments, the diameter (D1) of the disc 12B may be between 25% and 75% of the diameter (D3) of the annular ring 16. In some embodiments, the diameter (D1) of the disc 12B may be between 30% and 70% of the diameter (D3) of the annular ring 16. While such embodiments may provide advantages in some applications, yet other ratios and magnitudes of the diameters may be used to suit a particular application for example.

Figure 3A:
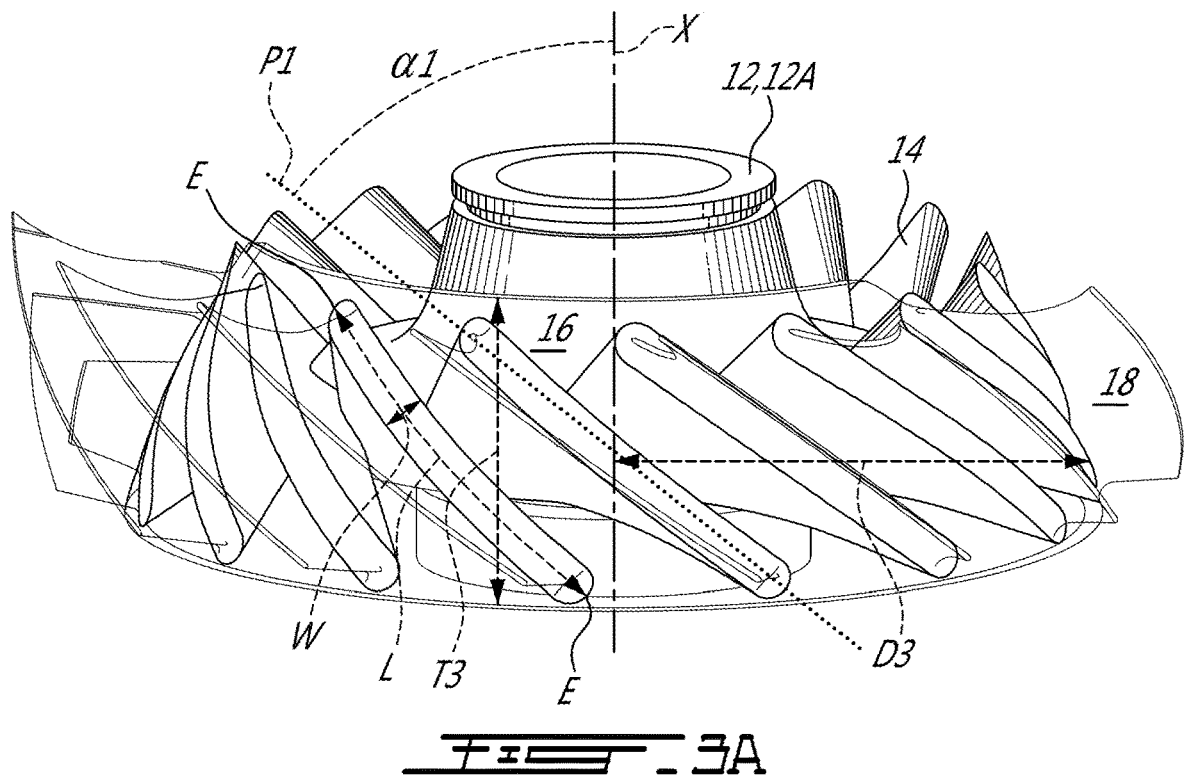
FIG. 3A is a partially transparent perspective view of a part of the rotor of FIG. 2A.
Figure 3B:
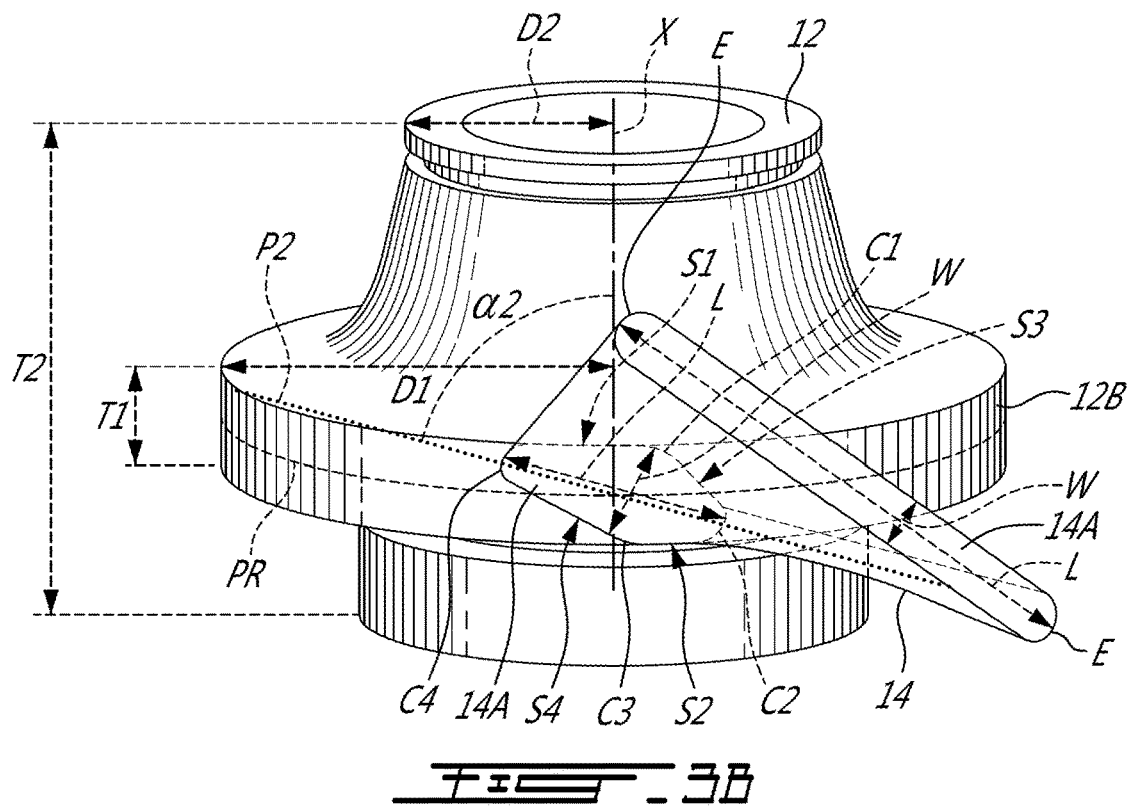
FIG. 3B is a view of a hub and a partially transparent structural member of the rotor of FIG. 2A.

As best shown in FIGS. 2B and 3A, the structural members 14 increase in cross-section as the structural members 14 extend from the hub 12 toward the annular ring 16. Stated otherwise, the structural members 14 have differing cross-sections 14A which increase as the structural members 14 extend from the hub 12 toward the annular ring 16. Referring to FIG. 3A, the cross-sections 14A have width (W) and a length (L), measured at a right angle relative to each other. For the purposes of this document, the length (L) of a given cross-section 14A is taken between two furthest points of the given cross-section 14A, whether or not the cross-section 14A is rectilinear and/or planar, and the width (W) is taken between two points of the given cross-section 14A, whether or not the cross-section 14A is rectilinear and/or planar, that are disposed furthest from each other along a direction taken at a right angle to a corresponding point along the length (L). In this particular embodiment, the lengths (L) are defined by corresponding pairs of opposite edges (E) (FIG. 3A) of the structural members 14, one of which edges (E) may be a leading edge and the other the trailing edge. Which of the edges (E) is the leading edge and which is the trailing edge may depend on each given embodiment and application, and more particularly on the direction of rotation, of the rotor 10. In some embodiments in which a given cross-section 14A is not rectilinear or planar (e.g. taken along a 3-dimensional curve), the length (L) and/or width (W) may be measured as per the definition above along a corresponding part/surface of the 3-dimensional curve. In such cases, the respective directions/lines of measurement of the length (L) and/or width (W) may thus be curved, as defined by the corresponding part/surface of the 3-dimensional curve.

In this particular embodiment, the lengths (L) increase as the structural members 14 extend from the hub 12 toward the annular ring 16. In this particular embodiment, the widths (W) decrease as the structural members 14 extend from the hub 12 toward the annular ring 16. In other embodiments, the widths (W) may change differently. For example, a given width (W) may increase along at least a part of a radial length of a corresponding structural member 14 and/or decrease along at least a part of the radial length and/or decrease along at least a part of the radial length while increasing along at least another part of the radial length. Stated more broadly, the widths (W) of the structural members 14 may vary along at least respective portions of the structural members 14.

As shown with the two different angles $\alpha_1$ and $\alpha_2$ with respect to one of the structural members 14 in FIGS. 3A and 3B, the cross-sections 14A of the structural members 14 rotate into the plane of rotation (PR) (FIG. 3B) of the hub 12, as explained in detail next. The angle $\alpha_1$ is measured between and orthogonal to a plane (P1) passing through a cross-section 14A of the structural member 14 which contacts the annular ring 16, and the rotation axis (X). In this embodiment, plane (P1) passes through the length (L) of that corresponding (radially-outer) cross-section 14A. In the present embodiment, the angle $\alpha_1$ is 45 degrees. In other embodiments, the angle $\alpha_1$ may be between 10 and 60 degrees relative to the rotation axis (X). Accordingly, it may be stated more broadly that the cross-sections 14A of the structural members 14 contacting the annular ring 16 may be angled between 10 and 60 degrees relative to the rotation axis (X).

The angle $\alpha_2$ is measured between and orthogonal to a plane (P2) passing through a cross-section 14A of the structural member 14 which contacts the disc 12B, and the rotation axis (X). In this embodiment, plane (P2) passes through the length (L) of that corresponding (radially-inner) cross-section 14A. In the present embodiment, the angle $\alpha_2$ is 70 degrees. In other embodiments, the angle $\alpha_2$ may be between 60 and 90 degrees relative to the rotation axis (X). Accordingly, it may be stated more broadly that the cross-sections 14A of the structural members 14 contacting the hub 12/disc 12B may be angled between 60 and 90 degrees relative to the rotation axis (X).

Hence, while the angles $\alpha_1$ and $\alpha_2$ may differ for example in the respective ranges described above, the angle $\alpha_2$ is larger than the angle $\alpha_1$. The cross-sections 14A of the structural members 14 are therefore said to rotate into the plane of rotation (PR) (FIG. 3B) of the hub 12, or become more aligned with the plane of rotation (PR), as the structural members 14 extend from the annular ring 16 to the hub 12. Hence, for a given structural member 14, the given structural member 14 is shaped such that the angle $\alpha_1$ increases with each cross-section 14A taken through the given structural member 14 at decreasing radial distances from the hub 12. Stated more broadly, as shown in FIG. 2A with respect to a given one of the structural members 14, the structural members 14 are shaped such that for the given one of the structural members 14, the cross-sections 14A of the given structural member 14 taken through the entire radial length (RL) of the given structural member 14 at the decreasing radial distances $(RD_1)$, $(RD_2)$ . . . $(RD_n)$ from the rotation axis (X) are correspondingly more and more aligned with the plane of rotation (PR) of the hub 12. The cross-sections 14A of the given structural member 14 that correspond to the example radial distances $(RD_1)$, $(RD_2)$ . . . $(RD_n)$ are shown schematically in FIG. 2A with respective reference numerals $14A_1$, $14A_2$, $14A_n$. Even more broadly, the structural members 14 are twisted (i.e. have twisted shapes selected so as) to approach in cross-sectional alignment the plane of rotation (PR) of the hub 12 in a direction from the annular ring 16 toward the hub 12.

It has been found that the embodiments described above provide for improved load distribution within the rotor 10 when the rotor 10 is in use, in at least some applications and operating conditions relative to prior art rotors in those applications and/or operating conditions. That said, in some embodiments, it is contemplated that in some embodiments and applications, the structural members 14 may be shaped such that the above "rotation" of the cross-sections 14A of the structural members 14 is present in one or more portions of the structural members 14 and not necessarily throughout the entire radial lengths (RL) of the structural members 14. Such alternative embodiments may also provide advantages over the prior art rotors in those applications and/or operating conditions.

Referring to FIG. 3B, a particular embodiment of the radially-inner cross-section 14A of a given one of the structural members 14 is shown. In this embodiment, the radially-inner cross-sections 14A of the rest of the structural members 14 are similar and are therefore not described in detail. As shown, the radially-inner cross-section 14A is defined by four sides (S1), (S2), (S3), (S4) of the given structural member 14, which are interconnected by convex portions (C1), (C2), (C3), (C4) of the given structural member 14. In this particular embodiment, the axially-opposite pair of the sides (S1) and (S2) are approximately parallel to each other, while the circumferentially-opposite pair of the sides (S3) and (S4) are angled relative to each other. While such embodiments may provide advantages in some applications, yet configurations of the radially-inner cross-sections 14A may be used to suit a particular application for example.

In this embodiment, the structural members 14 are airfoils/airfoil-shaped to generate a flow of fluid, such as air in air applications of the rotor 10. In some embodiments, only parts of the structural members 14 may be airfoils/airfoil-shaped. In some embodiments, no part of the structural members 14 may be an airfoil or airfoil-shaped. Referring to FIG. 2A, the rotor 10 further comprises a circumferential array of airfoils 18 connected to and extending radially outward from the annular ring 16. The airfoils 18 in this embodiment are similar to each other and therefore only one of the airfoils 18 has been labeled in each figure. As best seen in FIG. 3A, in this embodiment the airfoils 18, and more particularly the roots thereof, are superposed in a radial direction over corresponding ones of the radially-outer ones of the cross-sections 14A of the structural members 14. While this arrangement may provide advantages in some applications, other arrangements may be used, such as to suit a particular application of the rotor 10 for example. The structural members 14 and the airfoils 18 are shaped to generate respective airflows in the same direction in this embodiment. In this embodiment, the same direction is an axial direction and the airfoils 18 are axial flow airfoils.

In other embodiments, such as for example shown in the non-limiting embodiment of FIG. 1 when the rotor 10 is configured for use in the (HPC) section of the engine 1A, the airfoils 18 may be centrifugal flow airfoils. In some embodiments, and depending on the application of the rotor 10 for example, the structural members 14 and the airfoils 18 may be shaped to generate respective airflows in opposite directions. In each given embodiment, the structural members 14 and the airfoils 18 may be shaped and sized to generate the same, similar, or different magnitudes of the respective airflows, to suit the particular application(s) of the rotor 10 for example. As shown in FIG. 1, in aircraft engine applications, the rotor 10 may thus be used to generate two different airflows via two different airflow paths (A1), (A2) in a given engine 1A in which the rotor is used. It is contemplated that the different airflow paths (A1), (A2) and/or airflows may be used to provide any suitable functions associated with the given engine 1A.

Figure 4:
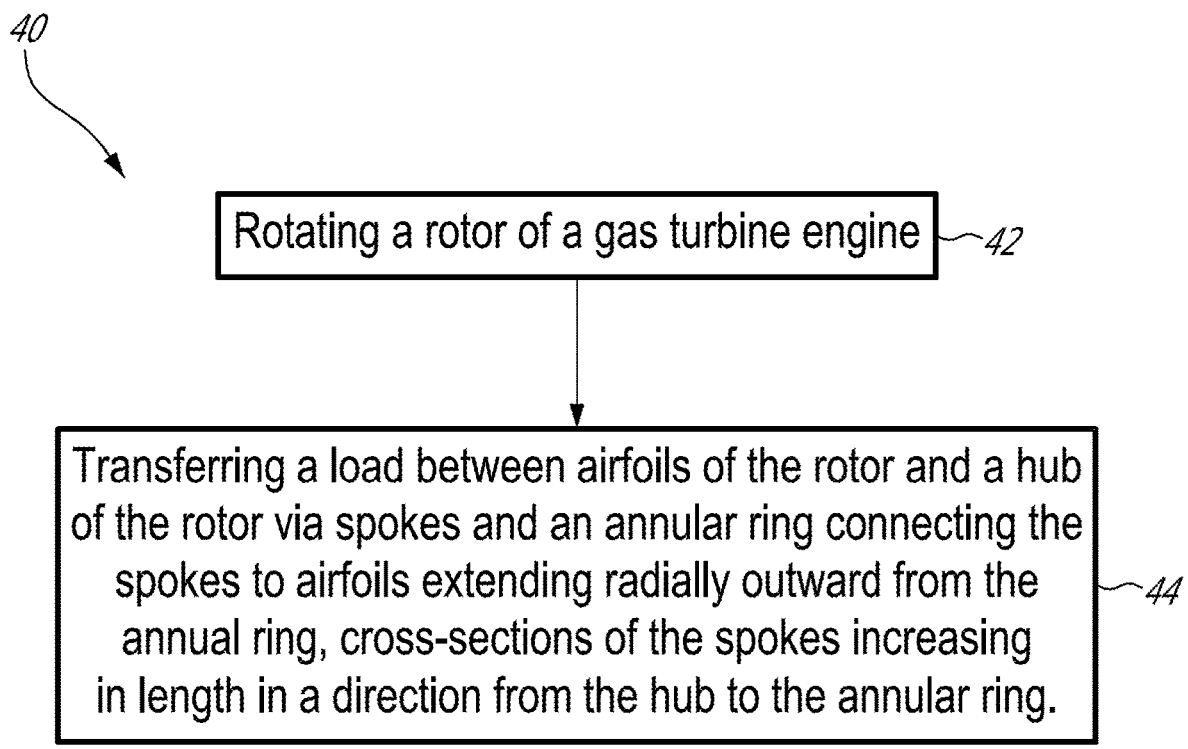
FIG. 4 is a diagram showing a method of distributing a load in the rotor of FIG. 2A.

With the above structure in mind, and now referring to FIG. 4, the present technology provides a method 40 of distributing a load in a rotor 10 of a gas turbine engine 1A. The method 40 may include a step 42 of rotating the rotor 10 about a rotation axis (X) thereof, and during the rotating 42, performing a step 44 of transferring a load, such as a centrifugal or axially-applied load(s) on the rotor 10 and/or its airfoils 18 for example, between airfoils 18 of the rotor 10 and a hub 12 of the rotor 10 via structural members 14 and an annular ring 16 connected to the structural members 14 in between the airfoils 18 and the structural members 14, cross-sections 14A of the structural members 14 increasing in length (L) in a direction from the hub 12 to the annular ring 16. In some embodiments, the step 44 of transferring the load(s) may include transferring the load(s) between radially-outer ones of the cross-sections 14A of the structural members 14, the annular ring 16, and radially-inner ones of cross-sections (i.e. at the roots) of the airfoils 18 which may be superposed in a radial direction over corresponding ones of the radially-outer ones of the cross-sections 14 of the structural members 14.

The various embodiments of the rotor 10 described above may be made using conventional engineering principles and manufacturing techniques. The above description provides non-limiting embodiments of the present technology. One skilled in the art will recognize that changes may be made to the embodiments described without departing from the scope of the technology disclosed herein. For example, in some embodiments/applications, the structural members 14 may be coated with one or more suitable conventional coatings to provide at least some protection against oxidation. Other modifications will also become apparent in light of the foregoing description and figures.

The invention claimed is:

1. A rotor for an aircraft engine, comprising:
a hub having a rotation axis;
a circumferential array of structural members extending radially outward from the hub to an annular ring, the structural members each having cross-sections that increase in length as the structural members extend from the hub to the annular ring, the length of each cross-section of the cross-sections being defined by opposite edges of the corresponding structural member of the structural members; and a circumferential array of airfoils extending radially outward from the annular ring.

2. The rotor of claim 1, wherein the rotor is one of a turbine rotor for a turbine section of the aircraft engine and a compressor rotor for a compressor section of the aircraft engine.

3. The rotor of claim 1, wherein the structural members are shaped such that for a given one of the structural members, cross-sections of the given structural member taken at least through a portion of the given structural member at decreasing radial distances from the rotation axis are correspondingly more aligned with a plane of rotation of the hub.

4. The rotor of claim 3, wherein the structural members are shaped such that for the given one of the structural members, cross-sections of the given structural member taken through an entire radial length of the given structural member at the decreasing radial distances from the rotation axis are correspondingly more aligned with the plane of rotation of the hub.

5. The rotor of claim 4, wherein the hub includes a central portion having a first thickness measured parallel to the rotation axis, and a disc extending radially away from the central portion parallel to a plane of rotation of the hub, the disc has a second thickness measured parallel to the rotation axis, the second thickness is smaller than the first thickness, and the structural members connect to the disc.

6. The rotor of claim 5, wherein the disc has a first diameter defined by a radially-outer periphery and measured in a plane of rotation of the hub, the annular ring has a second diameter measured in the plane of rotation, and the first diameter is between 25% and 75% of the second diameter.

7. The rotor of claim 6, wherein the first diameter is between 30% and 70% of the second diameter.

8. The rotor of claim 1, wherein the structural members are at least in part airfoil shaped.

9. The rotor of claim 3, wherein the cross-sections of the structural members contacting the annular ring are angled between 10 and 60 degrees relative to the rotation axis.

10. The rotor of claim 9, wherein the cross-sections of the structural members contacting the hub are angled between 60 and 90 degrees relative to the rotation axis.

11. The rotor of claim 1, wherein a width of the cross-sections varies along at least a portion of the structural members.

12. The rotor of claim 1, wherein the airfoils define a part of a first airflow path fluidly connecting a compressor section and a turbine section, and the structural members define a second airflow path extending through a part of the aircraft engine and being different from the first airflow path.

13. The rotor of claim 1, wherein the rotor is a plurality of rotors.

14. The rotor of claim 1, wherein radially-inner cross-sections of the structural members are defined by four sides interconnected by convex portions.

\* \* \* \* \*